United States Patent [19]

Copson

[11] Patent Number: 4,815,894
[45] Date of Patent: Mar. 28, 1989

[54] CONSTRUCTION AND USE OF SUBSEA BORE HOLES

[75] Inventor: Alexander G. Copson, London, England

[73] Assignee: Consolidated Environmental Technologies Limited, United Kingdom

[21] Appl. No.: 25,323

[22] Filed: Mar. 12, 1987

[30] Foreign Application Priority Data

Mar. 12, 1986 [GB] United Kingdom ............... 8606168
Sep. 3, 1986 [GB] United Kingdom ............... 8621281

[51] Int. Cl.⁴ ............................................. B09B 1/00
[52] U.S. Cl. ..................................... 405/128; 405/195; 405/210; 405/227
[58] Field of Search ............... 405/128, 129, 227, 130, 405/208, 228, 195, 224, 225

[56] References Cited

U.S. PATENT DOCUMENTS

| 367,547 | 8/1887 | Poetsch | 405/130 X |
|---|---|---|---|
| 371,389 | 10/1889 | Smith | 405/130 |
| 736,308 | 8/1903 | Sooysmith | 405/130 |
| 3,271,962 | 9/1966 | Dahms et al. | 405/130 |
| 3,754,403 | 8/1973 | Mott et al. | 405/208 X |
| 3,999,395 | 12/1976 | Broms et al. | 405/227 |
| 4,187,039 | 2/1980 | Jahns et al. | 405/130 X |
| 4,597,444 | 7/1986 | Hutchinson | 405/130 X |
| 4,618,286 | 10/1986 | Michel et al. | 405/208 |

FOREIGN PATENT DOCUMENTS

0023872 2/1977 Japan ..................... 405/128

*Primary Examiner*—Dennis L. Taylor
*Attorney, Agent, or Firm*—Henry M. Bissell

[57] ABSTRACT

It is proposed to construct a large diameter subsea bore hole (e.g. about 10 to 50 meters in diameter) provided with a stable wall by a method which comprises drilling a number of bore holes around the circumference of a ring of large diameter, supplying to the ring bore holes material to locally stabilize the surrounding geologic formations, and forming a central bore hole, or shaft, within the perimeter of the ring by drilling and reaming or by excavation. The ring bore holes and locally stabilized geologic formations form a stable wall of large diameter for the central bore hole shaft. It is contemplated that a large diameter subsea bore hole of the type described above could be used for the safe emplacement and disposal beneath the seabed of a large waste job object such as the shielded reactor core of a decommissioned nuclear submarine, or of other waste objects containing radioactive material.

10 Claims, 13 Drawing Sheets

CONSTRUCTION AND USE OF SUBSEA BORE HOLES

Using existing offshore technology it is now possible to drill holes under the seabed many thousands of meters deep. Drilling operations can be conducted from many different types of platform (e.g. semi-submersible marine platform, jack-up rig, jacket, drilling tender etc). Generally small diameter bore holes (i.e. up to about 3 meters) are drilled for use in locating and producing oil and gas from subsea bed-reservoirs. Generally the bore holes are cased, either in concrete or steel, in order to contain oil or gas under pressure and in order to prevent collapse of the bore hole.

It is now proposed to construct a large diameter subsea bore hole (e.g. about 10 to 50 meters in diameter) provided with a stable wall by a method which comprises drilling a number of bore holes around the circumference of a ring of large diameter, supplying to the ring bore holes material to locally stabilise the surrounding geologic formations, and forming a central bore hole, or shaft, within the perimeter of the ring by drilling and reaming or by excavation. The ring bore holes and locally stabilized geologic formations form a stable wall of large diameter for the central bore hole shaft.

After construction the central bore hole may be further stabilized by means of a concrete lining.

Methods and means for carrying out the construction of large diameter subsea bore holes will now be described, by way of example only, with reference to the accompanying drawings in which:

FIG. 5 (A-L) shows schematically a method and means for the construction and use of a large diameter subsea bore hole;

A first aspect of the invention is described having reference to FIGS. 1 to 5.

Figure 1:
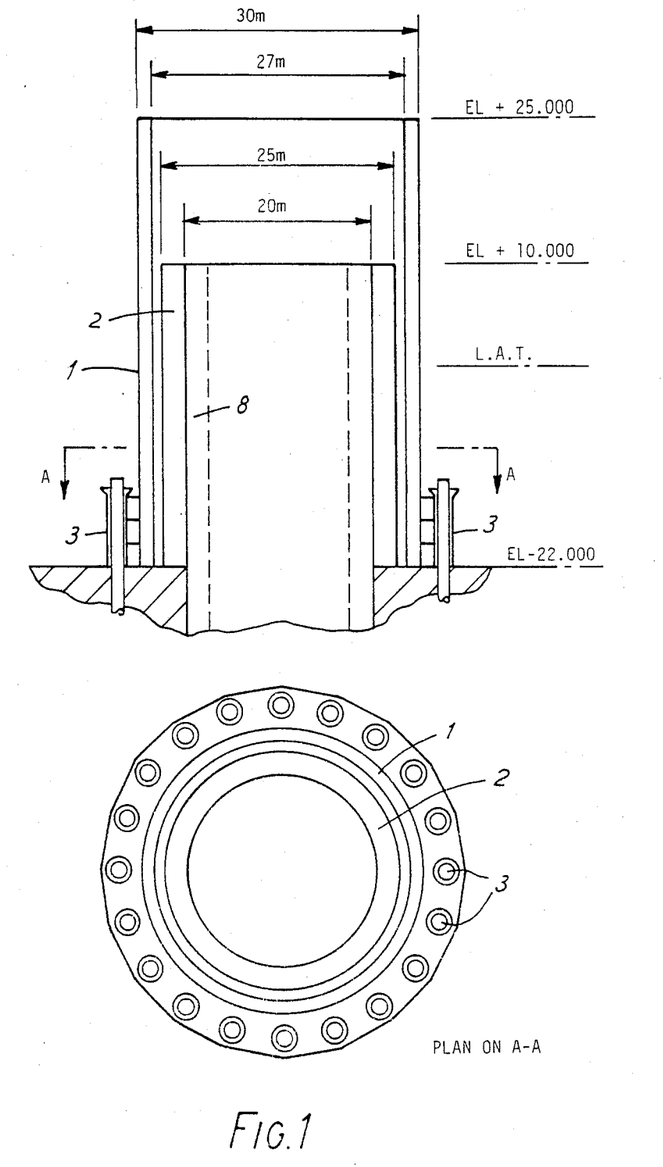
FIGS. 1A and 1B show schematically an offshore piled caisson structure in plan and elevation views.

FIG. 1 (A and B) illustrates a piled steel caisson structure at an offshore site where the lowest astronomical tide (L.A.T.) provides a water depth of 22 m.

The structure comprises two double-skinned caissons; an outer structural caisson 1 and an inner freeze wall caisson 2. The outer caisson 1 extends 25 m over LAT and is piled to the seabed by a circumferential ring of piles 3. The piles 3 are suitably of approximately 2.5 m diameter; 20 such piles spaced around the 35 m periphery of the illustrated caisson would result in a pile to pile spacing of 5.5 m. The piles are preferably stabbed and driven to a depth of about 45 m below the mudline by the use of followers and above water hammers (e.g. steam hammers). After driving, the piles may be connected to their enclosing sleeves by cement grout. The outer casing is designed to withstand external wind and wave forces. It is designed to be connected to water retaining and ground stabilizing means so as to exclude water from the internal space. It is also capable of supporting either a mining module during shaft sinking operations or other operational/maintenance/monitoring modules in use of the completed large diameter bore hole; in order that a deck module may be directly supported at the level of the top of the structural caisson 1 it is preferred that at least some of the piles 3 extend upwardly to the full height of the structural caisson 1.

The inner freeze wall caisson 2 is located within the outer caisson; between the inner and outer caissons there is created an annular space of about 2m gap width. Freeze lines (not shown) for use in freezing pass through the annular space within the walls of the inner caisson 2 and extend downwardly below the mudline through a ring of bored holes. The freeze lines may for example be brine pipes for carrying brine chilled to about −30° C. The annular space within the walls of the inner caisson is filled with a material, such as wet sand, which will freeze to form a rigid wall. This rigid wall provides a stable transition zone between frozen geologic formations in the seabed below the mudline and any topside units. The height of the freeze wall will preferably be at least that of the highest astronomical tide (HAT). The annular space between the inner and outer caissons may be water filled and in such a case the water may be discouraged from freezing by agitation, e.g. by bubbling air through the water to cause circulation therein.

The freeze wall caisson 2 is designed to be structurally independent of the caisson 1 and this minimises foundation loading close to the freeze wall. In order to ensure stability of the freeze wall caisson, pin piles may be driven through its base into the seabed. The material within the walls of the inner caisson and the geologic formations in the seabed below the mudline are frozen by passing freezing material such as chilled brine through the freeze lines. Once the inner freeze wall and geologic formations are completely frozen they are maintained in a frozen state with further freezing material whilst the shaft of a large diameter central bore hole is sunk within the space defined by the inner wall of the inner caisson. The shaft may be sunk to a depth of e.g. 100–500 m below the mudline. It is preferable that the central bore hole shaft be provided with a concrete lining 8 for extra stability. Such a lining can be poured in stages as the shaft is constructed.

Figure 2:
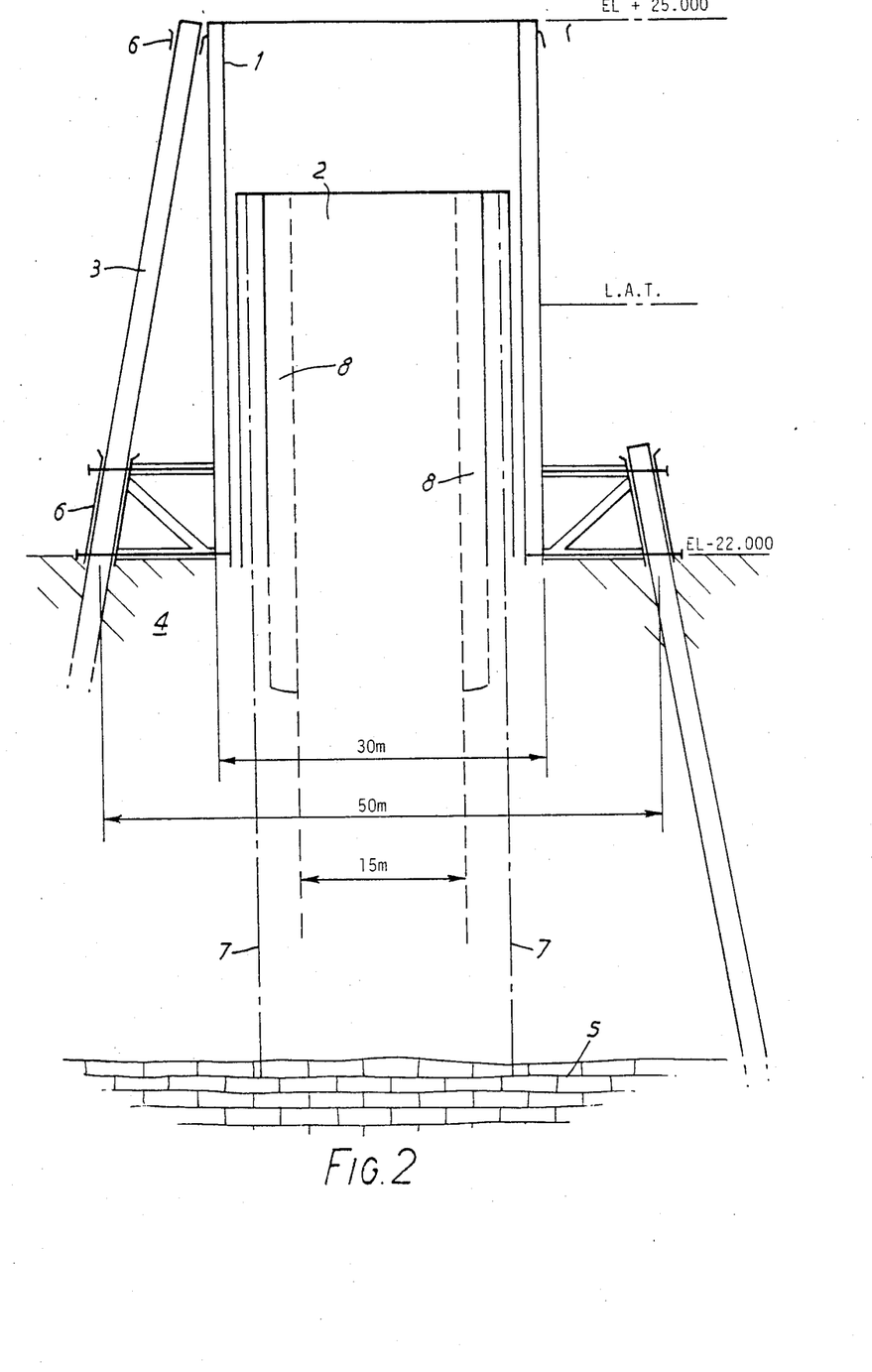
FIG. 2 shows schematically an offshore caisson structure having battered piles.

In FIG. 2 there is illustrated a caisson structure which is attached to the seabed over geologic formations of clay/sand 4 and chalk 5. The outer structural caisson 1 is piled by battered piles 3 passing through angled pile guides 6. The caisson may be more difficult to install than the caisson with vertical piles because of the large base diameter of the lower pile guides, but the caisson will have the advantage of exhibiting greater stability, i.e. it will be more stable under impact or extreme storm conditions. As in the caisson structure of FIG. 1, at least some of the piles 3 may extend up to deck height and be load-bearing.

In FIG. 2 freeze lines 7 are shown extending downwardly through the clay/sand stratum 4 to reach a chalk layer 5. Depending on the surrounding geology it may be necessary to create a frozen wall over only part of the depth of the shaft of the central bore hole; e.g. a lined shaft in a deep chalk stratum may provide a sufficiently stable wall without freezing. For example, soil data for a suitable offshore site might indicate the following deposits:

0–13 m: silty sandy clay with gravel and pebbles;
13–22.5 m: fine to medium sand;
22.5–28 m: flint gravel;
28–44 m: stiff clay;
44–750 m: chalk.

Such a site might require a freeze wall to stabilize the surrounding geology to a depth of about 50 m below the mudline.

Figure 3:
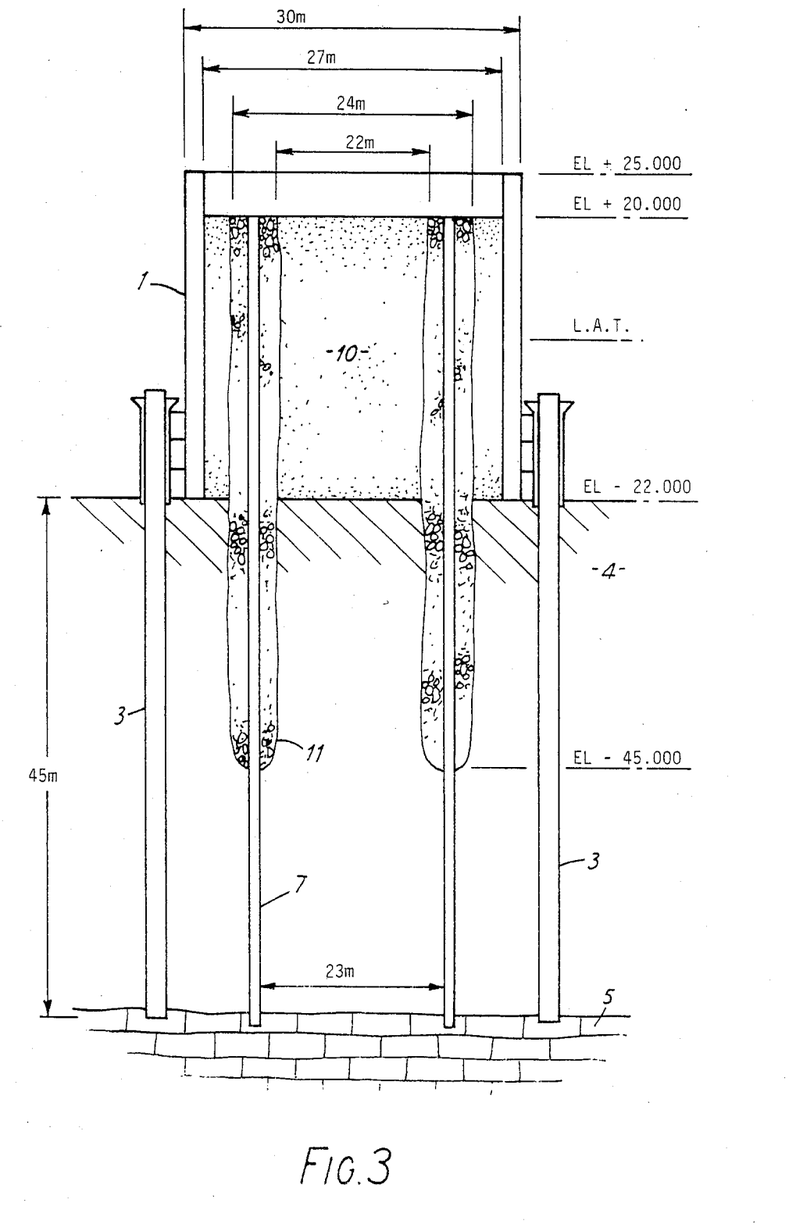
FIG. 3 shows an alternative caisson structure.

In FIG. 3 there is provided an outer structural caisson 1 piled to the seabed by vertical piles 3. The piles are driven through clay/sand 4 into chalk 5. The caisson 1 is sand filled 10. An inner freeze wall caisson is not provided; instead an annular concrete diaphragm wall 11 is provided to a depth of about 20 m below the mudline. The wall 11 is constructed by excavating an annular trench, using material such as bentonite slurry to temporarily support the sides of the trench, and then filling the excavated annulus with concrete. The annular trench may suitably be formed by sequentially cutting adjacent trench sections—for example each section may be about 3 m in length, 1m in width and 60 m in depth. Freeze lines 7 are cast into the diaphragm wall 11 and extend downwardly beyond the lower limit of the wall 11.

Figure 4:
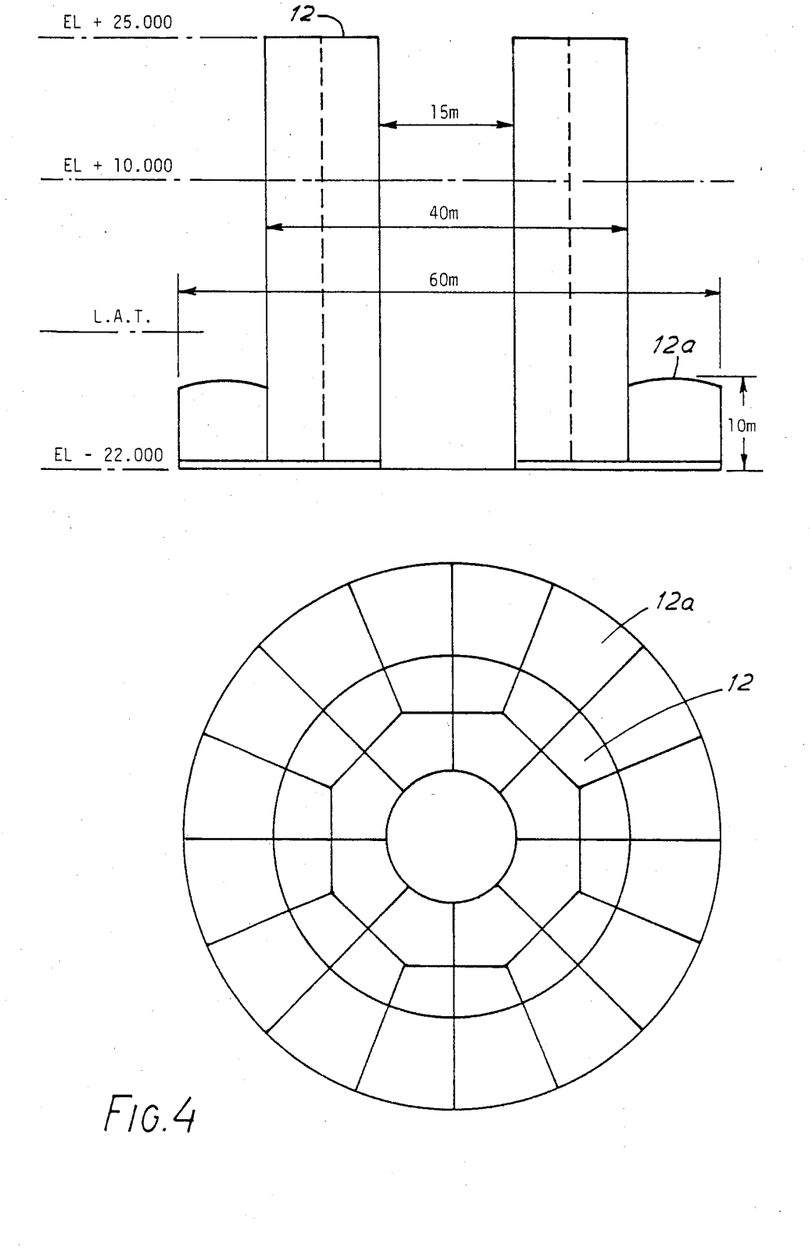
FIG. 4 shows a further alternative caisson structure in plan and elevation views.

Whilst a piled steel caisson is currently favoured, it would be possible in an alternative arrangement to use as the outer structural caisson a massive gravity structure fabricated from concrete or steel. Such a structure is shown in FIG. 4, and comprises a wall portion 12 and a base portion 12a. The base size must be large enough to safely transmit dead weight and environmental forces into the seabed. The shaft of a large diameter central bore hole may be constructed within the periphery of the wall 12. Steel skirts (not shown) may extend beneath the base of the gravity structure to improve sliding stability and to lengthen water flow paths (i.e. to improve water cut-off). Freeze lines may, for example, be run within the inner space of the structure or within pipeways in the wall itself.

Figure 5A:
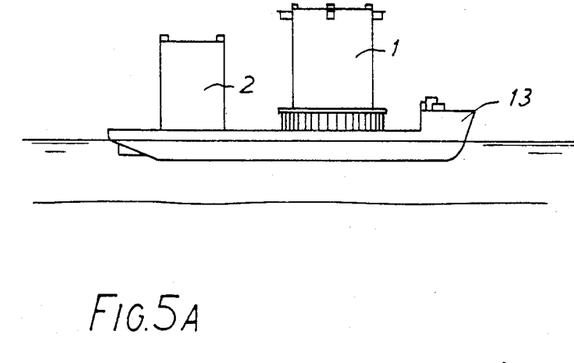

FIG. 5 (A-L) illustrates the construction and use of a large diameter stabilized subsea bore hole. The following steps are shown:

(A) The outer structural caisson 1 and the inner freeze wall caisson 2 are loaded onto a barge 13 and transported to the selected offshore site.

Figure 5B:
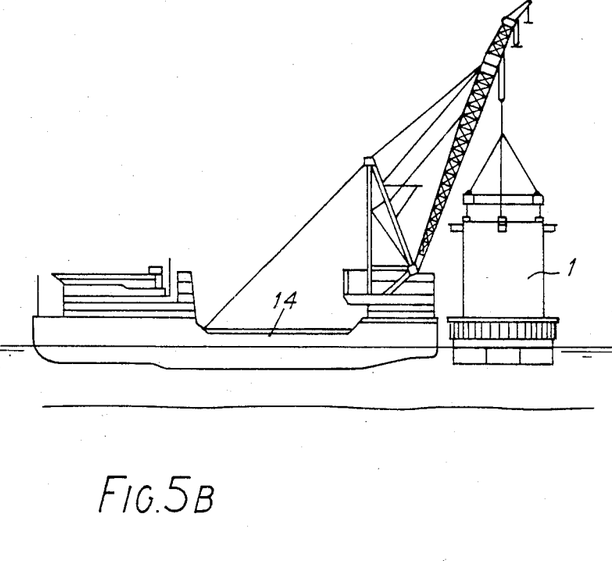

(B) The outer caisson 1 is lifted off the barge 13 by a floating crane vessel 14.

Figure 5C:
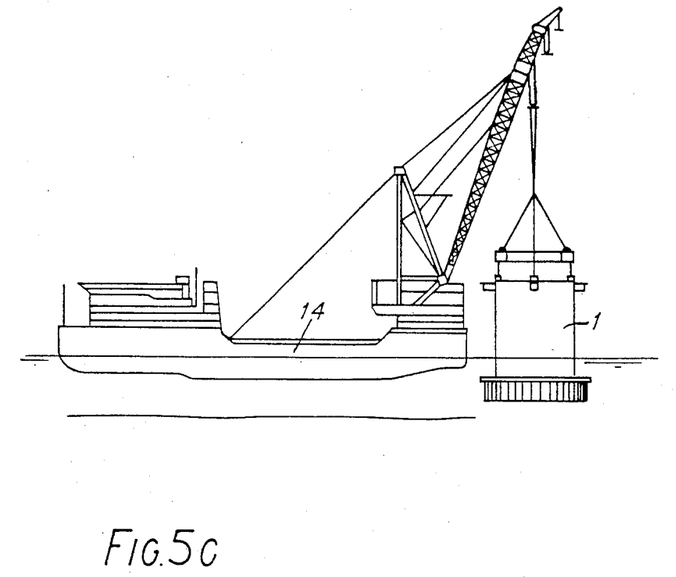

(C) The outer caisson 1 is lowered and installed on the seabed.

Figure 5D:
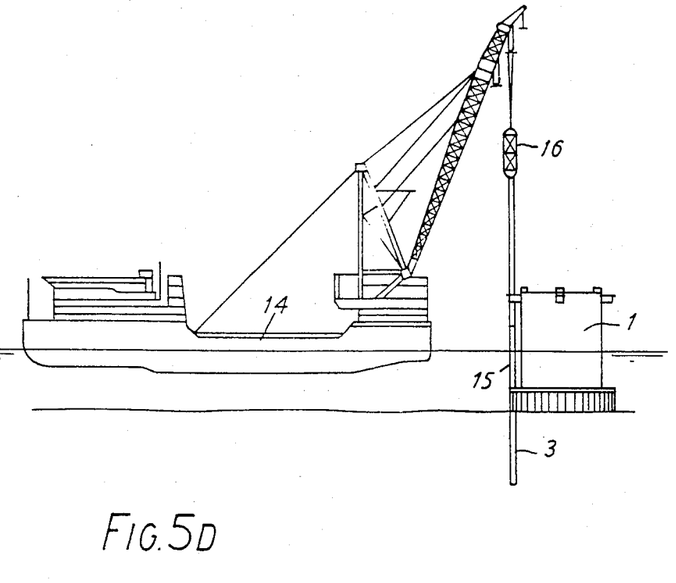

(D) Outer piles 3 are stabbed and driven using followers 15 and an above water hammer 16.

Figure 5E:
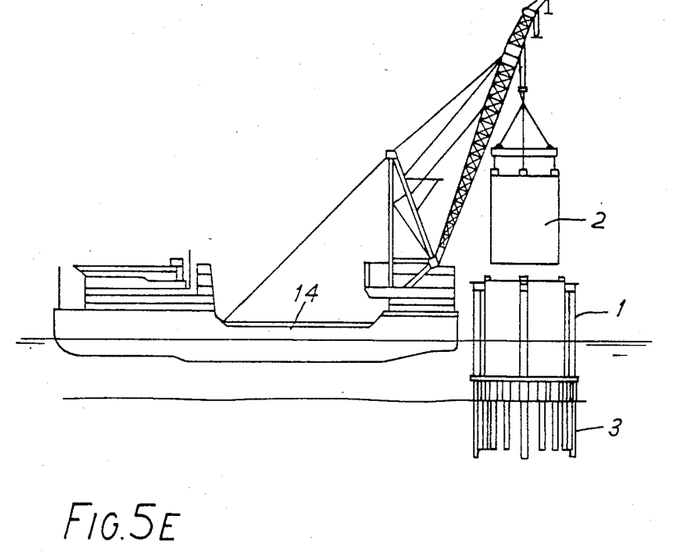

(E) The inner freeze wall caisson 2 is lifted off the barge 13 by the crane 14 and is installed on the seabed within the outer caisson 1.

Figure 5F:
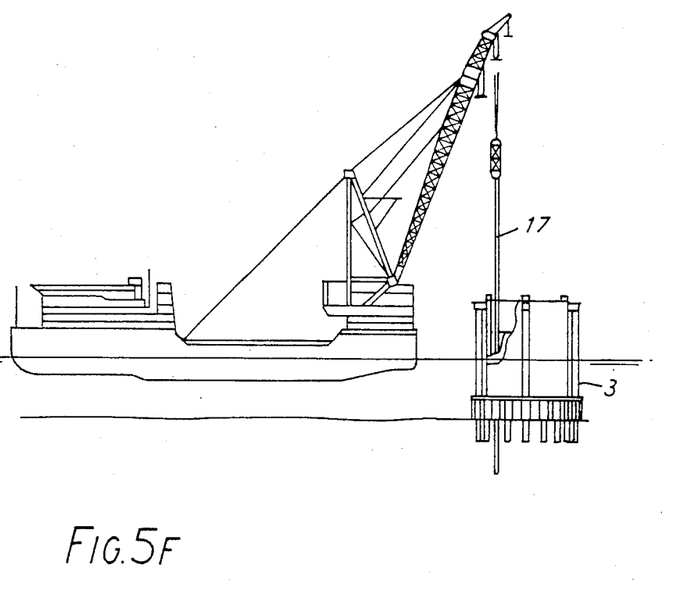

(F) Inner pin piles 17 are stabbed and driven. Installation of both caissons is completed by grouting of the piles 3, 17.

Figure 5G:
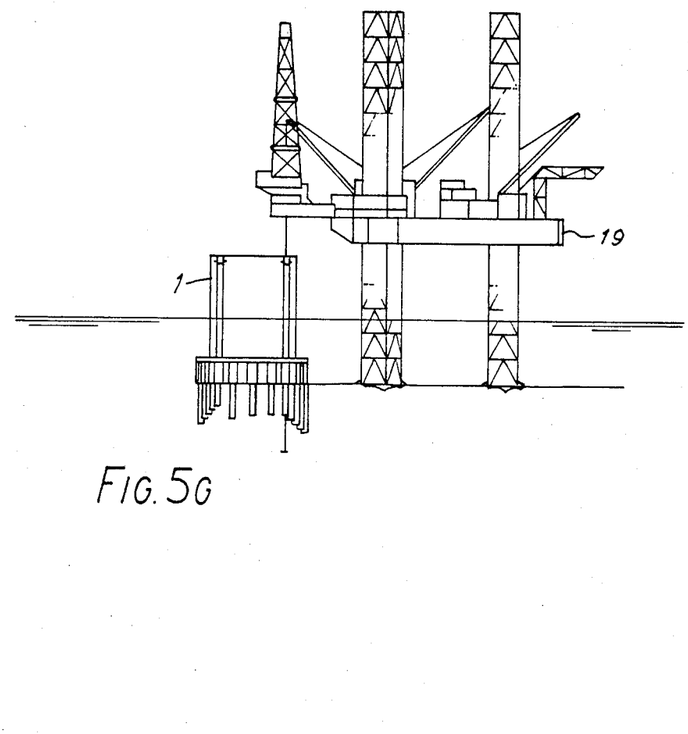

(G) Freeze walls for carrying freeze lines 7 are constructed by drilling a ring of bore holes within the annular space within the walls of the caisson. Drilling is carried out from a jack-up rig 19—alternatively a portable drilling derrick may be mounted over the caisson structure. Freezing of the caisson freeze-wall and the subsoil geology is carried out by pumping chilled brine through the freeze lines to the freeze wells.

Figure 5H:
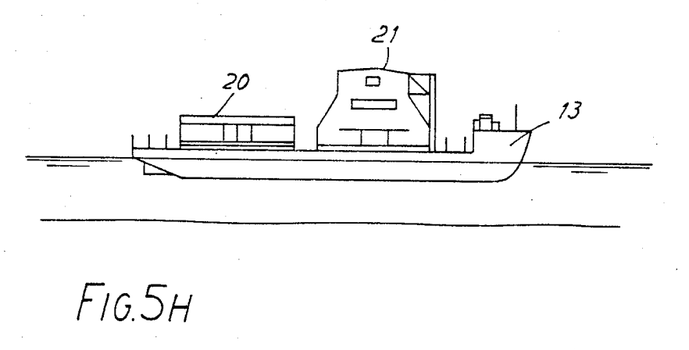

(H) A deck module 20 and a mining headgear module 21 are loaded onto a barge 13 and transported to the site.

Figure 5I:
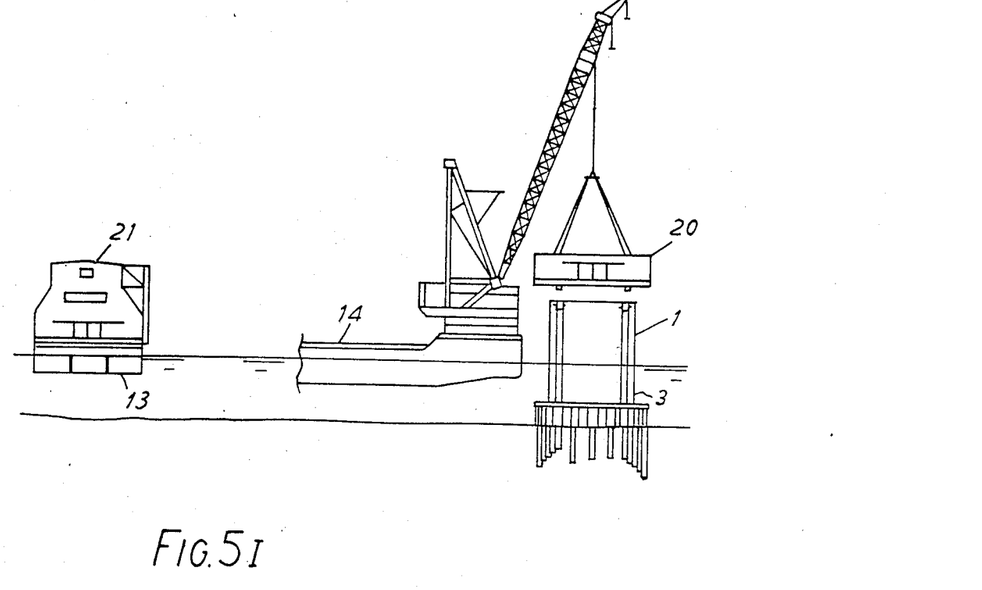

(I) The deck module 20 is installed on the outer structural caisson, and is supported by upwardly extended piles 3.

Figure 5J:
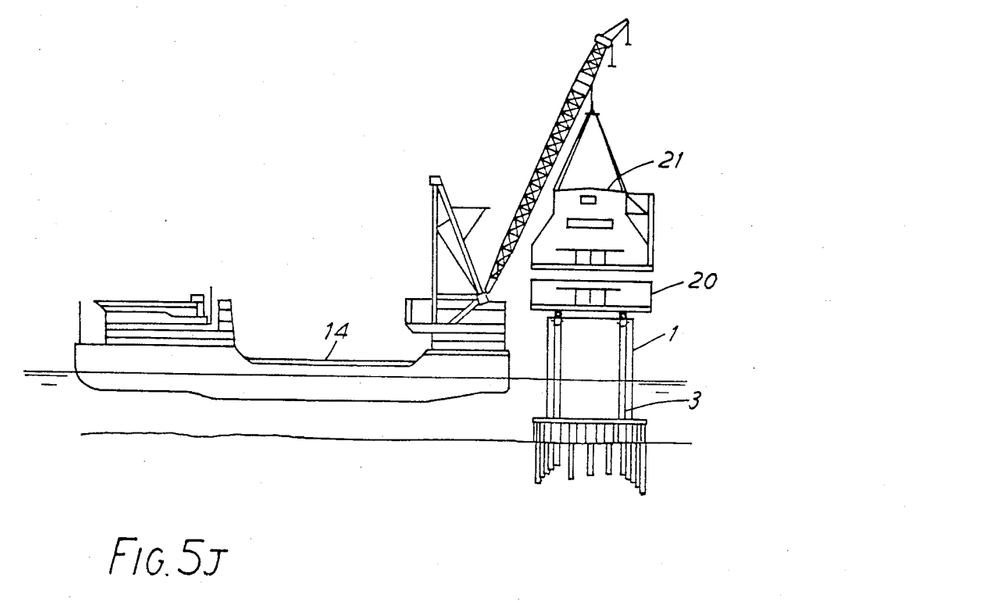

(J) The mining headgear module 21 is installed.

Figure 5K:
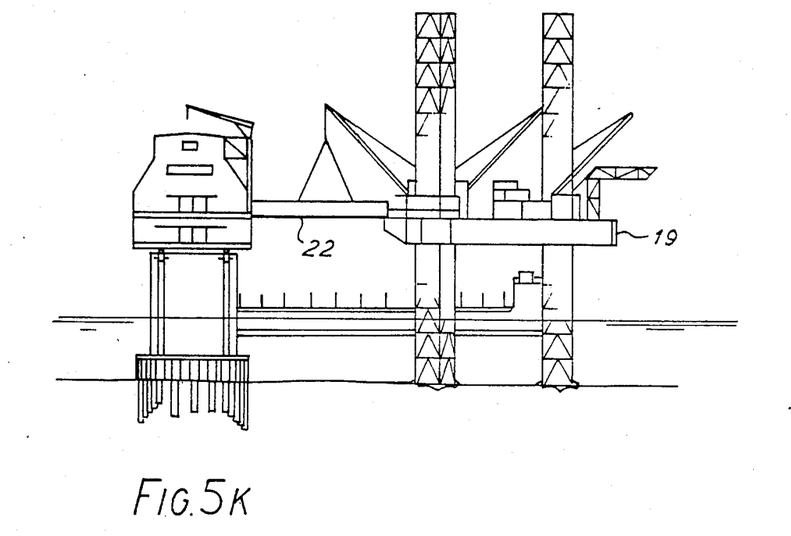

(K) A jack-up rig 19 installs a span bridge 22 to allow servicing of the mining operations. A large diameter bore hole shaft is excavated to the desired depth below the mudline. The shaft is concrete-cased as it is constructed. Spoil from the excavation may either be dumped locally or it may be loaded onto suitable vessels and transported away. After completion of the excavation the deck and mining modules are removed, one or more waste objects for disposal are placed in the central bore hole, and the bore hole is back-filled.

Figure 5L:
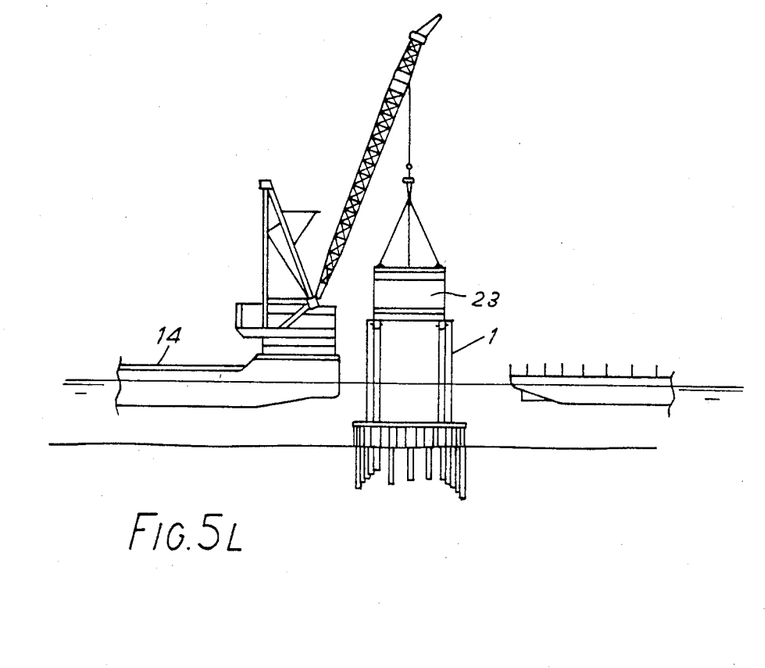

(L) Once the hole has been filled a module 23 (comprising for example monitoring equipment, maintenance facilities, and emergency personnel shelter and a helideck) is transported to the site and installed on the caisson structure. Since a greater freezing capacity is required to initially freeze the geology than is required to maintain it frozen, it is contemplated that at least some of the ring bore holes of the freeze wells may be used to house down-hole monitoring equipment such as seismographic and radiological survey equipment, temperature and pressure sensors etc.

A second aspect of the invention is described having reference to FIGS. 6 to 9.

Figure 6:
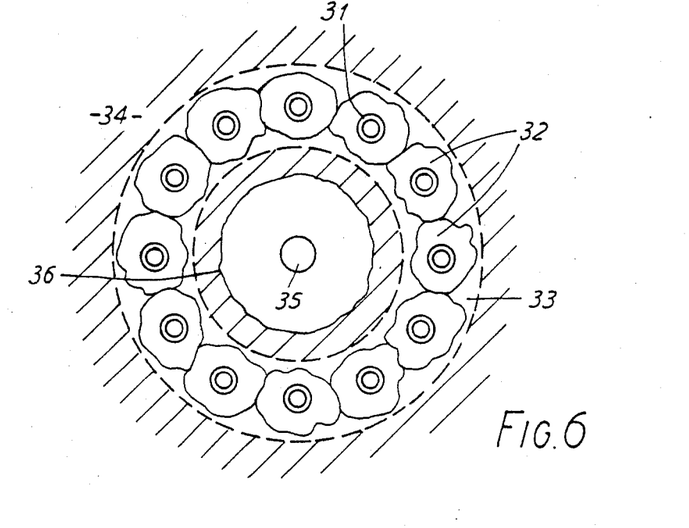
FIG. 6 shows a schematic plan view of a ring of small diameter bore holes.

As shown in FIG. 6 a number of small bore holes 31 are drilled around the circumference of a ring. The holes are of conventional size used in the offshore industry. The holes are perforated after completion and a stabilizing material is pumped into the bores so as to locally penetrate and "freeze" the surounding areas 32. The material may, for example, be liquid nitrogen or may be a cementitious material or a combination of materials. The effect of the ring of bores is to create a stable wall 33 to hold back the surrounding geologic formations 34. Once the ring wall has been completed the central portions 35 can be bored out and then reamed to the desired large diameter 36. The reaming technique will depend on the geology, but for example, the reaming may be carried out by scraper blades mounted on a conventional drill string or may be carried out by blasting the inside of the bore with a fluid cutting medium expelled under great pressure from a nozzle in a rotating cutter head.

Figure 7:
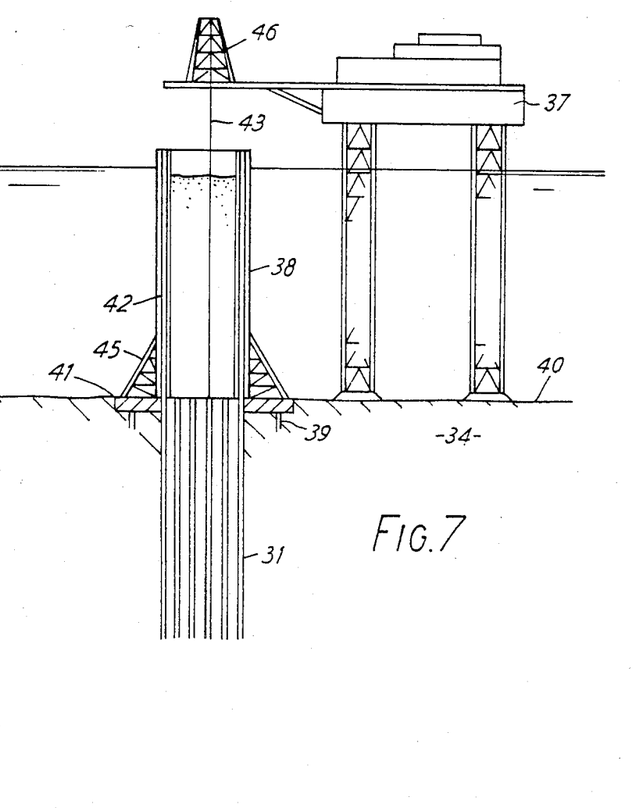
FIG. 7 shows a self-supporting riser in place over a large diameter subsea bore hole.
Figure 8A:
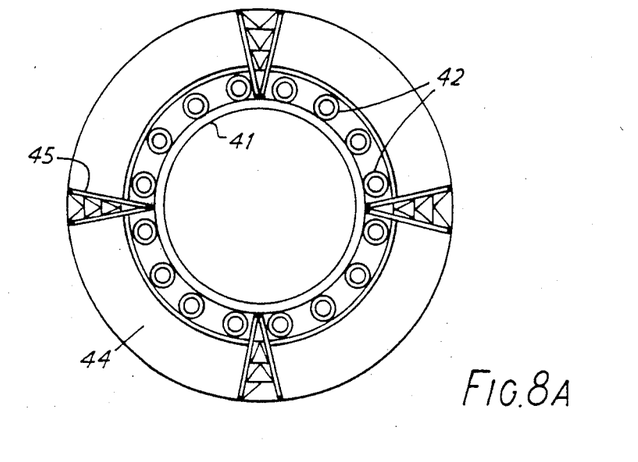
FIGS. 8A and 8B show schematic cross-sections of self-supporting risers.
Figure 8B:
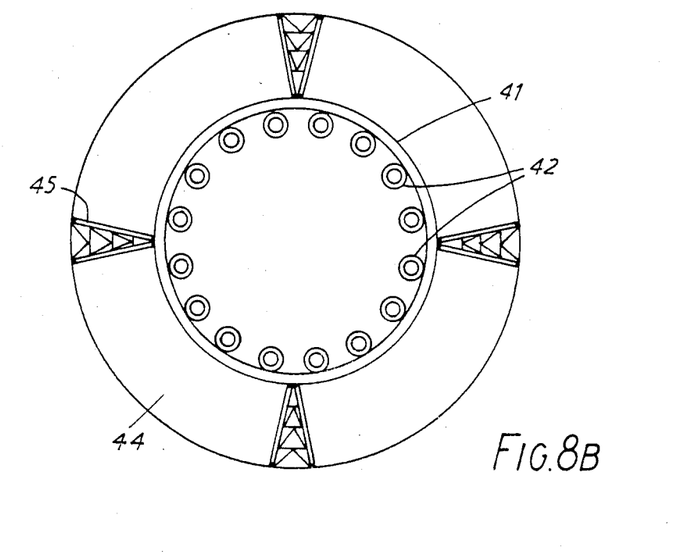

FIG. 7 illustrates a jack-up rig 37 working over a self-supporting riser 38 which is piled (by piles 39 through base 44) to the seabed 40. As shown in plan view in FIG. 8a the self-supporting riser 38 comprises a central riser body 41 surrounded by a number of drill conductors 42 for guiding a drill string 43 during drilling of the ring of bore holes 31. Clearly, as an alternative, the drill guides could be surrounded by the riser body 41 as shown in FIG. 8b. The riser 38 is supported on the base 44 by bracing members 45. In FIG. 7 a jack-up rig 37 is shown using a skidded drilling derrick 46 to work over the riser 38; the work over could equally be carried out by another type of platform such as a semi-submersible marine platform, a drilling tender or the like.

It is preferred that the riser and base be shipped to the drill site as an integral unit. However, an alternative arrangement is possible in which a template having a ring of drill guides is piled to the seabed, the ring of bore holes is drilled through the template and subsequently a riser (without peripheral drill guides) is swaged on to the template.

When the riser is in position on the seabed it will be sealed at the bottom end (e.g. by trenching and grouting) and supplied inside with drilling mud etc. in the normal way.

Figure 9:
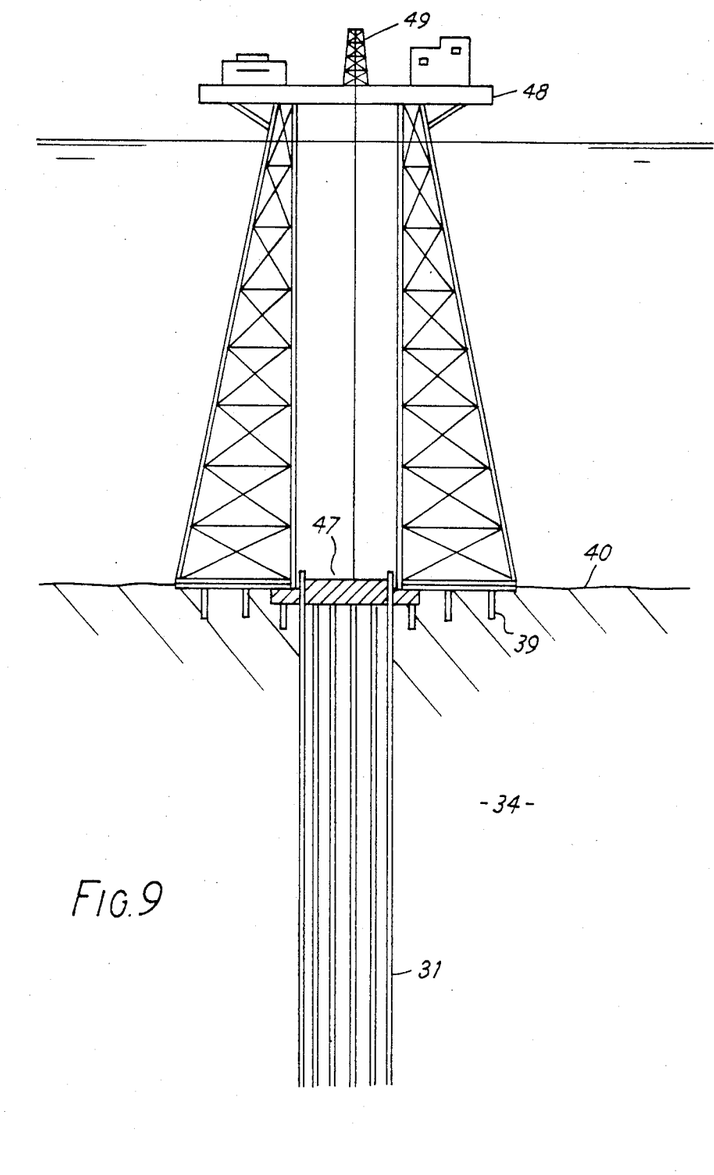
FIG. 9 shows a jacket in place over a large diameter subsea bore hole.

In deep water a self-supporting riser may not be sufficiently robust and it may be preferred to install a jacket, as illustrated in FIG. 9. A template 47 with drill guides is piled 39 to the seabed 40 and a jacket 48 is positioned over the template. A drilling derrick 49 can be used to work over the template to bore the required holes 31. Once the ring of bores has been drilled and the geologic formations locally frozen the central bore can be drilled and reamed as previously described.

Large diameter subsea bore holes have not previously been drilled. In the offshore oil and gas industry it is usual to drill small diameter bore holes and to case them with rigid casing sections. Until now there has been no call for subsea bore holes for purposes other than those of the offshore oil and gas industry.

It is presently contemplated that a large diameter subsea bore hole of the type described above could be used for the safe emplacement and disposal beneath the seabed of a large waste object such as the shielded reactor core of a decommissioned nuclear submarine.

Depending on the depth of the hole, one or more reactor cores could be entombed in each hole.

When a reactor reaches the end of its useful life it is usual to dismantle it, by removal of the protective shielding and cladding and subsequent removal of radioactive core parts. Such dismantling is expensive and can be dangerous. Reactor cores are always well shielded and strongly constructed and hence it is proposed to utilise the existing structure of the reactor rather than destroy it. It is more cost effective and safer to dispose of a reactor core as an integral unit rather than in pieces.

In an example of a proposed method of disposal, the decommissioning of a nuclear powered submarine will be considered. The core of such a submarine is typically about 10 to 30 meters in cross section and weighs about 300–800 tonne. When the submarine is to be decommissioned the disposal of radioactive waste from the reactor core poses a problem. It is proposed that the hull and superstructure of the submarine surrounding the core be cut away leaving an integral shielded unit containing all of the radioactive material. This can be handled more safely than individual broken-down parts of the whole.

It is proposed that a complete reactor core be transported to a suitable offshore site where it is placed at the bottom of a large diameter subsea hole (of the type constructed as described above) and then sealed off from the environment e.g. by back filling the bore hole with cementitious material. Clearly, a waste product of this kind which contains radioactive material is disposed of much more safely and surely by retaining its existing protective shielding, and sealing it in cement deep below the seabed, than by breaking it up into parts and storing or burying the parts on land.

I claim:

1. A method of constructing a subsea bore hole about 10 to 50 meters in diameter provided with a stable wall comprising the steps of:
   (a) placing a self-supporting caisson structure at a chosen location at sea, said caisson structure having an internal space from which external water may be excluded;
   (b) drilling a plurality of bore holes around the circumference of a ring of large diameter through said internal space of said caisson;
   (c) supplying a selected material to said ring bore holes which is capable of interacting with the material surrounding said ring bore holes to locally stabilize surrounding geologic formations; and
   (d) forming a central shaft within said ring;
   wherein said ring bore holes and locally stabilized geologic formations form a stable wall of large diameter for said central shaft.

2. The method of claim 1 wherein said central shaft is formed by drilling and reaming.

3. The method of claim 1 wherein said central shaft is formed by excavation.

4. The method of claim 1 wherein said selected material comprises brine at about $-30°$ C.

5. The method of claim 1 wherein said caisson structure is piled to the sea bed by battered piles passing through angled pile guides.

6. The method of claim 1 wherein said caisson structure comprises two double-skinned caissons: an outer structural caisson to withstand external wind and wave forces and to exclude external water; and an inner caisson within said outer caisson and spaced radially therefrom, an annular space within walls of said inner caisson carrying means for supplying said ring bore holes with said selected material, and further including the step of filling said annular space with a substance capable of forming a rigid wall.

7. A method of constructing a large-diameter subsea bore hole provided with a stable wall comprising the steps of:
   (a) loading an outer structural caisson and an inner freeze-wall caisson onto a barge and transporting said caissons to a preselected offshore site;
   (b) lifting said outer caisson off said barge by a floating crane vessel;
   (c) lowering said outer caisson and installing said outer caisson on a seabed at said offshore site;
   (d) stabbing and driving outer piles using followers and an above-water hammer;
   (e) lifting said inner freeze-wall caisson off said barge with said crane and installing said freeze-wall caisson within said outer caisson on said seabed site;
   (f) stabbing and driving inner pin piles and installing both said caissons by grouting said outer and inner piles;
   (g) constructing freeze walls for carrying freeze lines by drilling a ring of bore holes within an annular space within said inner caisson;
   (h) freezing said caisson freeze wall and a subsoil formation underneath said site by pumping chilled brine through said freeze lines;
   (i) loading a deck module and a mining headgear module onto said barge and transporting them to said site;
   (j) installing said deck module on said outer caisson and supporting said deck module by upwardly extended piles;
   (k) installing said mining headgear module;
   (l) installing a span bridge with a jack-up rig to allow servicing of mining operations; and
   (m) excavating a large-diameter central shaft to a desired depth and concrete-casing said shaft as it is being constructed.

8. A method of disposal of large, highly radioactive waste objects comprising the steps of:
  (a) loading an outer structural caisson and an inner freeze-wall caisson onto a barge and transporting said caissons to a preselected offshore site;
  (b) lifting said outer caisson off said barge by a floating crane vessel;
  (c) lowering said outer caisson and installing said outer caisson on a seabed at said offshore site;
  (d) stabbing and driving outer piles using followers and an above-water hammer;
  (e) lifting said inner freeze-wall caisson off said barge with said crane and installing said freeze-wall caisson within said outer caisson on said seabed site;
  (f) stabbing and driving inner pin piles and installing both said caissons by grouting said outer and inner piles;
  (g) constructing freeze walls for carrying freeze lines by drilling a ring of bore holes within an annular space within said inner caisson;
  (h) freezing said caisson freeze wall and a subsoil formation underneath said site by pumping chilled brine through said freeze lines;
  (i) loading a deck module and a mining headgear module onto said barge and transporting them to said site;
  (j) installing said deck module on said outer caisson and supporting said deck module by upwardly extended piles;
  (k) installing said mining headgear module;
  (l) installing a span bridge with a jack-up rig to allow servicing of mining operations;
  (m) excavating a large-diameter central shaft to a desired depth and concrete-casing said shaft as it is being constructed;
  (n) removing said deck and mining modules after said excavating is completed;
  (o) placing at least one said waste object at a bottom of said central shaft; and
  (p) back-filling said central shaft.

9. The method of claim 8 wherein said waste object is a shielded reactor core from a decommissioned nuclear submarine.

10. The method of claim 8 wherein said waste object is a nuclear reactor core with its original protective shielding and said back-filling of said shaft is done with a cementitious material.

* * * * *